(12) United States Patent
Tanaka et al.

(10) Patent No.: US 12,337,465 B2
(45) Date of Patent: Jun. 24, 2025

(54) ENABLE SWITCH DEVICE AND LOAD DRIVE CONTROL APPARATUS EQUIPPED WITH SAME

(71) Applicant: Panasonic Intellectual Property Management Co., Ltd., Osaka (JP)

(72) Inventors: Yasuyuki Tanaka, Osaka (JP); Kei Aimi, Osaka (JP); Yasuhiro Kinugasa, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 173 days.

(21) Appl. No.: 18/468,717

(22) Filed: Sep. 17, 2023

(65) Prior Publication Data
US 2024/0001563 A1    Jan. 4, 2024

Related U.S. Application Data

(63) Continuation of application No. PCT/JP2022/021056, filed on May 23, 2022.

(30) Foreign Application Priority Data

Jun. 3, 2021 (JP) ................................. 2021-093409

(51) Int. Cl.
    *B25J 13/06*    (2006.01)
(52) U.S. Cl.
    CPC ..................... *B25J 13/06* (2013.01)
(58) Field of Classification Search
    CPC .......... B25J 13/06; B25J 9/1674; B25J 19/06; G05B 2219/39443
    USPC ......................................................... 700/245
    See application file for complete search history.

(56) References Cited

U.S. PATENT DOCUMENTS

| | | | |
|---|---|---|---|
| 6,051,894 A | 4/2000 | Shimogama | |
| 7,337,014 B2* | 2/2008 | Yuasa | G05B 19/427 700/83 |
| 9,079,317 B2* | 7/2015 | Preisinger | G05B 9/02 |
| 2006/0212167 A1 | 9/2006 | Nobuhiro et al. | |

(Continued)

FOREIGN PATENT DOCUMENTS

| | | |
|---|---|---|
| JP | 10-071592 | 3/1998 |
| JP | 2004-209579 | 7/2004 |
| JP | 2004-338050 | 12/2004 |

OTHER PUBLICATIONS

International Search Report of PCT application No. PCT/JP2022/021056 dated Aug. 2, 2022.

*Primary Examiner* — Kira Nguyen
(74) *Attorney, Agent, or Firm* — Wenderoth, Lind & Ponack, L.L.P.

(57) ABSTRACT

Enable switch device (100) transitions to position 1 when not operated, to position 2 when mid-operated, and to position 3 when full-operated. Enable switch device (100) includes first switch (SW1) and second switch (SW2) each being a two-position switch, and first signal processor (10). First signal processor (10) determines in which one of positions 1 to 3 an operated state of enable switch device (100) is, based on an output signal of first switch (SW1) and an output signal of second switch (SW2). First signal processor (10) detects presence or absence of failure in each of first switch (SW1) and second switch (SW2).

12 Claims, 9 Drawing Sheets

(56) References Cited

U.S. PATENT DOCUMENTS

| | | | |
|---|---|---|---|
| 2008/0253345 A1* | 10/2008 | Sanguinetti | H01Q 1/241 |
| | | | 370/339 |
| 2017/0093309 A1* | 3/2017 | Nishino | B25J 9/126 |
| 2018/0297212 A1* | 10/2018 | Kino | H01H 21/24 |
| 2021/0008728 A1* | 1/2021 | Chen | G05G 1/02 |
| 2023/0226700 A1* | 7/2023 | Matsumoto | B25J 13/06 |
| | | | 700/264 |

* cited by examiner

FIG. 4

| STATE | STATE | | POTENTIAL | | | |
|---|---|---|---|---|---|---|
| | SW1 | SW2 | SW1 | | SW2 | |
| | | | TERMINAL a | TERMINAL b | TERMINAL a | TERMINAL b |
| POSITION 1 | OFF | OFF | H | L | H | L |
| POSITION 2 | ON | OFF | L | H | H | L |
| POSITION 3 | ON | ON | L | H | L | H |

FIG. 8

| STATE | STATE | | | | POTENTIAL | | | | | | | | |
|---|---|---|---|---|---|---|---|---|---|---|---|---|---|
| | SW11 | SW21 | SW12 | SW22 | SW11 | | SW21 | | SW12 | | SW22 | |
| | | | | | TERMINAL a | TERMINAL b | TERMINAL a | TERMINAL b | TERMINAL a | TERMINAL b | TERMINAL a | TERMINAL b |
| POSITION 1 | OFF | OFF | OFF | OFF | H | L | H | L | H | L | H | L |
| POSITION 2 | ON | OFF | ON | OFF | L | H | H | L | L | H | H | L |
| POSITION 3 | ON | ON* | ON | ON* | L | H | L | H | L | H | L | H |

* When either SW21 or SW22 transitions to ON state, STATE transitions from POSITION 2 to POSITION 3.

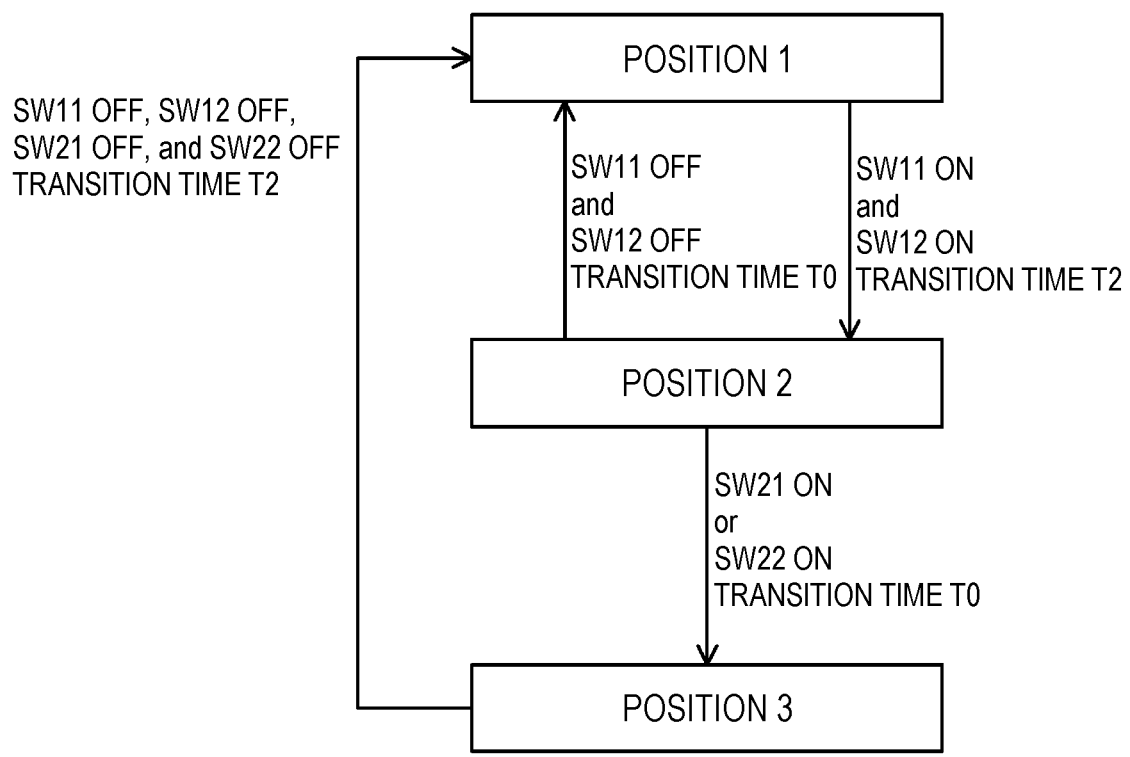

ENABLE SWITCH DEVICE AND LOAD DRIVE CONTROL APPARATUS EQUIPPED WITH SAME

TECHNICAL FIELD

The present disclosure relates to an enable switch device and a load drive control apparatus including the enable switch device.

BACKGROUND ART

In industrial robots, a work of teaching such as initially setting a robot controller and operating a robot is often performed through a teaching pendant provided with a robot controller. During a work of teaching, an operator needs to come close to a robot while operating a teaching pendant. Thus, a failure of devices including a robot or an operation error made by an operator may cause a serious accident.

To prevent such accidents, the teaching pendant is usually equipped with a three-position switch. By using the three-position switch, the robot is emergently stopped by an action of releasing an operation switch or tightly gripping the operation switch, and this secures safety of the operator.

Patent Literature 1 discloses an enable device including two three-position switches and two monitor circuits for monitoring the state of the three-position switches. Two monitor devices are connected to two three-position switches, respectively. With such a configuration, even when either of the two monitor circuits is short-circuited, safety of operation is secured.

CITATION LIST

Patent Literature

PTL 1: Unexamined Japanese Patent Publication No. 2004-209579

SUMMARY OF THE INVENTION

Technical Problem

In an enable switch device including two-position switch, it is desirable that a robot reliably transitions to a safe state, corresponding to the state of a two-position switch. When a short fault or an open fault occurs in the two-position switch in the enable switch device, the failure state needs to be detected and the robot needs to be transitioned to a safe state. The conventional configuration disclosed in Patent Literature 1 can detect a short fault of a monitor circuit but has no function of detecting a failure in the two-position switch.

The conventional enable switch device disclosed in Patent Literature 1 outputs the state of the three-position switch via a plurality of electromagnetic on-off relays. However, the life of the electromagnetic on-off relay is short, and thus the electromagnetic on-off relay has to be replaced very frequently. This disadvantageously increases the cost for replacing components of the enable switch device.

The present disclosure has been made in view of the above point. An object of the present disclosure is to provide an enable switch device capable of determining an operated state with a simple configuration and detecting a failure in an internal two-position switch, and a load drive control apparatus including the enable switch device.

Solution to Problem

To achieve the above object, an enable switch device according to the present disclosure is an enable switch device that transitions to a first position that is OFF state when not operated, to a second position that is ON state when mid-operated, and to a third position that is OFF state when full-operated, the enable switch device including at least a first switch, a second switch, and a first signal processor, where each of the first switch and the second switch is a two-position switch, and the first signal processor is configured to determine in which one of the first position, the second position, and the third position an operated state of the enable switch device is, based on an output signal of the first switch and an output signal of the second switch, and detect presence or absence of failure in each of the first switch and the second switch.

The load drive control apparatus according to the present disclosure includes at least the enable switch device and a control device communicatable with the enable switch device. When it is determined that the enable switch device is in ON state, the control device transmits a drive permission signal to a load communicatable with the control device, and when it is determined that the enable switch device is in OFF state, the control device transmits a drive stop signal to the load.

Advantageous Effect of Invention

According to an enable switch device of the present disclosure, an operated state can be determined with a simple configuration. In addition, failure in an internal two-position switch can be detected.

According to the load drive control apparatus of the present disclosure, happening of accident caused by an operation error made by an operator, for example, can be prevented, and safety of the operator is secured. In addition, an unintentional operation of a load can be prevented.

BRIEF DESCRIPTION OF THE DRAWINGS

FIG. 4 is a diagram illustrating a determination result of a first state determination unit.

FIG. 8 is a diagram illustrating determination results of a first state determination unit and a second state determination unit.

FIG. 9 is a schematic diagram illustrating transition of an operated state of an enable switch device according to a fourth exemplary embodiment.

DESCRIPTION OF EMBODIMENT

Exemplary embodiments of the present disclosure will now be described with reference to the drawings. The following descriptions of preferable exemplary embodiments are merely illustrative in nature, and are not intended to limit the scope, applications, or use of the present disclosure in any way.

First Exemplary Embodiment

[Configuration of Robot System]

Figure 1:
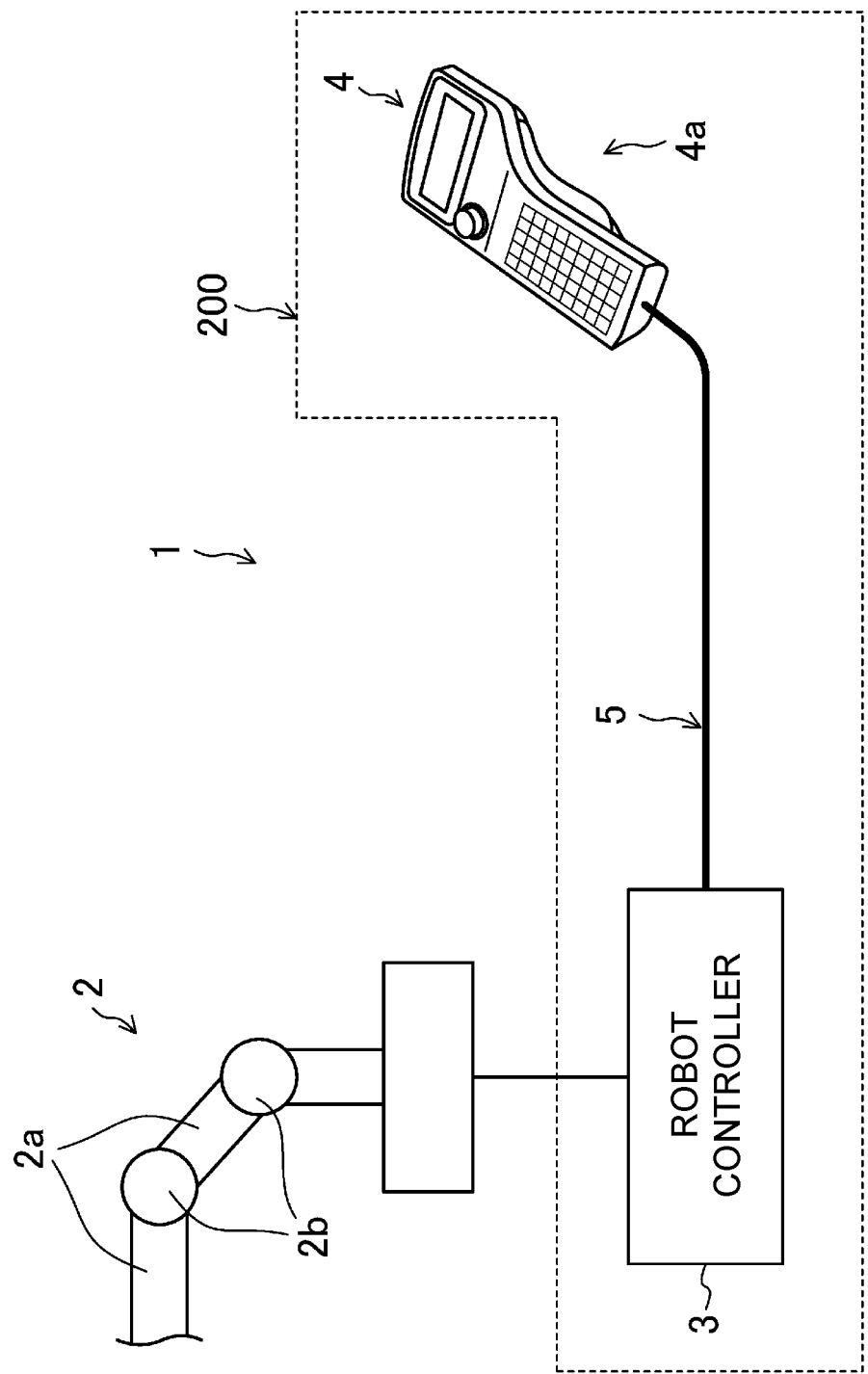
FIG. 1 is a schematic configuration diagram of a robot system according to a first exemplary embodiment.

FIG. 1 is a schematic configuration diagram of a robot system according to the present exemplary embodiment, and robot system 1 includes robot 2 and load drive control apparatus 200. Load drive control apparatus 200 includes robot controller (control device) 3 and teaching pendant 4.

Robot 2 is a vertical articulated robot, and includes a plurality of robot arms 2a and a plurality of joint shafts 2b. Motor M (see FIG. 2) is connected to each of the plurality of joint shafts 2b.

Robot controller 3 is a known central processing unit (CPU) or a computer. Robot controller 3 is communicatable with a plurality of motors M. Robot controller 3 controls the operation of each of the plurality of motors M.

Teaching pendant 4 is an input device for performing initial setting of robot controller 3. Teaching pendant 4 is a teaching device for teaching operations of robot 2.

Teaching pendant 4 includes operation switch 4a and enable switch device 100 (see FIG. 2) connected to operation switch 4a. The internal state of enable switch device 100 changes, corresponding to the operated state of operation switch 4a. According to the change in the state, robot 2 is permitted to operate and is regulated.

In FIG. 1, robot controller 3 and teaching pendant 4 can exchange data with each other via communication cable 5. However, the present invention is not particularly limited to this configuration. Robot controller 3 and teaching pendant 4 may be able to exchange data with each other by wireless communication.

[Configuration of Load Drive Control Apparatus and Enable Switch Device]

Figure 2:
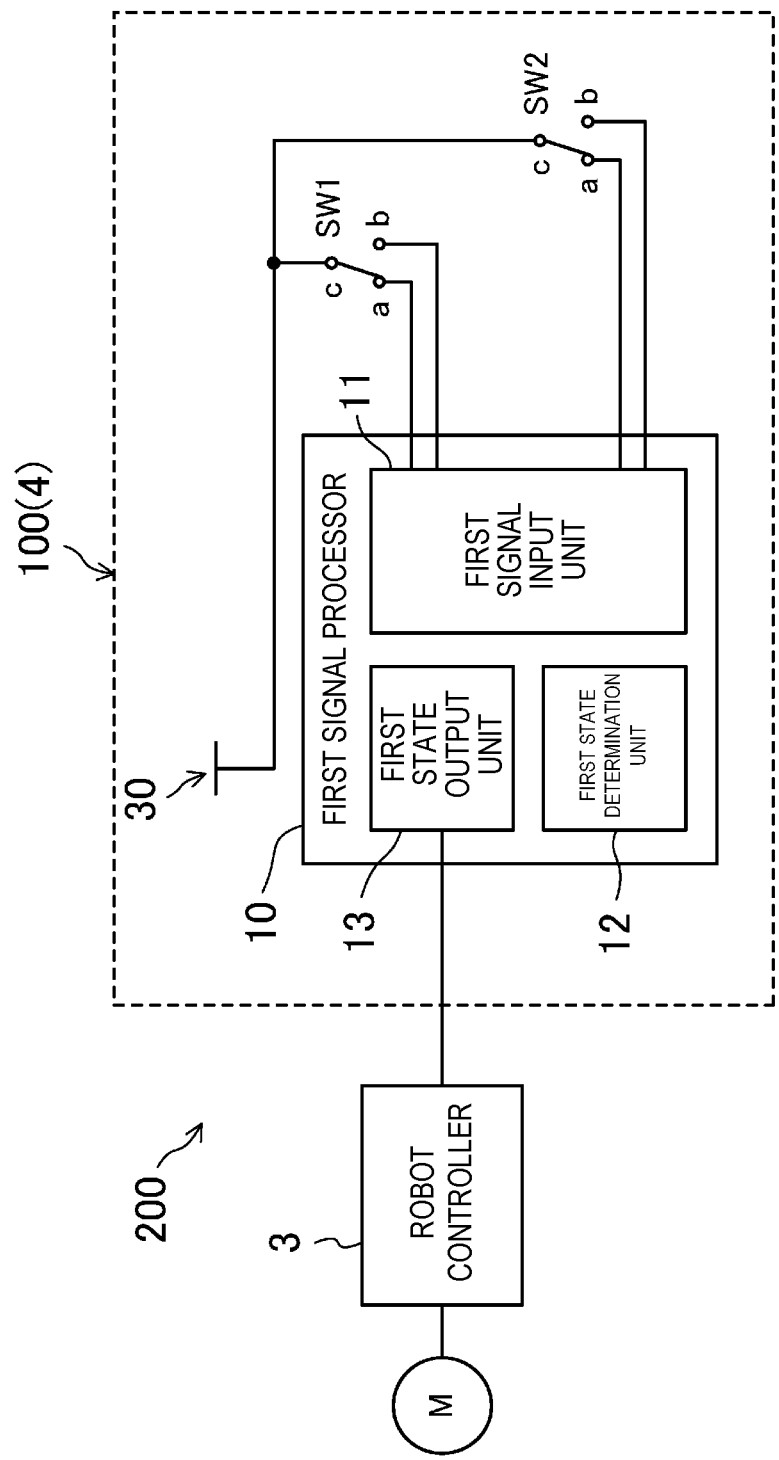
FIG. 2 is a schematic configuration diagram of a load drive control apparatus.
Figure 3:
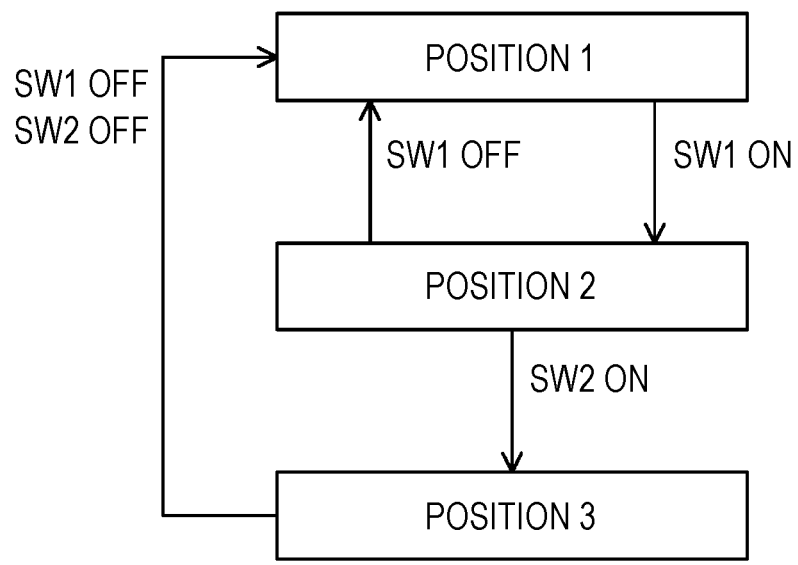
FIG. 3 is a schematic diagram illustrating transition of an operated state of an enable switch device.

FIG. 2 illustrates a schematic configuration diagram of the load drive control apparatus, and FIG. 3 schematically illustrates transition of the operated state of the enable switch device. FIG. 4 illustrates a determination result of a first state determination unit. In FIG. 2, only enable switch device 100, of teaching pendant 4, is illustrated in a form of a circuit diagram. For convenience of description, only motor M connected to one of joint shafts 2b is illustrated, but as described above, motor M is provided by a number corresponding to the number of joint shafts 2b. Driving of each motor M is permitted and regulated in response to an output signal of enable switch device 100.

Enable switch device 100 includes first switch SW1, second switch SW2, and first signal processor 10. Enable switch device 100 includes power source 30. Note that, power source 30 may be external to enable switch device 100.

First switch SW1 and second switch SW2 are two-position switches, and each have terminals a, b, c. Terminals c are common terminals of first switch SW1 and second switch SW2, and are each connected to power source 30. That is, first switch SW1 is connected in parallel with second switch SW2. Each of first switch SW1 and second switch SW2 switches between a state where terminal c and terminal a are in a conduction state and a state where terminal c and terminal b are in a conduction state by an operation of operation switch 4a described above. A terminal connected to power source 30 via terminal c becomes high potential (hereinafter, referred to as H potential), and a terminal electrically separated from power source 30 becomes low potential (hereinafter, referred to as L potential).

First signal processor 10 is a known CPU or a computer. First signal processor 10 includes at least first signal input unit 11, first state determination unit 12, and first state output unit 13.

First signal input unit 11 receives an output signal of each of first switch SW1 and second switch SW2 and inputs the output signal to first state determination unit 12. Note that, the output signal of first switch SW1 is represented by a combination of the potential of terminal a and the potential of terminal b (see FIG. 4). Similarly, the output signal of second switch SW2 is represented by a combination of the potential of terminal a and the potential of terminal b (see FIG. 4).

First state determination unit 12 determines the operated state of enable switch device 100 based on the signal input from first signal input unit 11. First state determination unit 12 detects presence or absence of failure in each of first switch SW1 and second switch SW2 based on the signal input from first signal input unit 11. These will be described later.

The function of first state determination unit 12 is implemented by executing predetermined software in first signal processor 10. That is, first state determination unit 12 is a functional block in first signal processor 10.

First state output unit 13 outputs the operated state of enable switch device 100 based on the determination result of first state determination unit 12.

When operation switch 4a is not operated, both first switch SW1 and second switch SW2 are in OFF state. In this case, as illustrated in FIG. 3, the operated state of enable switch device 100 is in position 1. As illustrated in FIG. 4, first switch SW1 is in OFF state when terminal a is in H potential and terminal b is in L potential. When terminal a is in L potential and terminal b is in H potential, first switch SW1 is in ON state. Similarly, second switch SW2 is in OFF state when terminal a is in H potential and terminal b is in L potential. When terminal a is in L potential and terminal b is in H potential, second switch SW2 is in ON state.

When the operated state of enable switch device 100 is in position 1, enable switch device 100 is in OFF state. First state output unit 13 outputs a signal to robot controller 3. Since robot controller 3 recognizes that enable switch device 100 is in OFF state, robot controller 3 transmits a drive stop signal to motor M. As a result, drive control of motor M cannot be performed, and robot 2 does not operate.

Enable switch device 100 is configured such that first switch SW1 first transitions to ON state when the operator operates operation switch 4a. When first switch SW1 is in ON state and second switch SW2 is in OFF state, as illustrated in FIG. 3, the operated state of enable switch device 100 is in position 2. This state is also referred to as a mid-operated state.

When the operated state of enable switch device 100 is in position 2, enable switch device 100 is in ON state. First state output unit 13 outputs a signal to robot controller 3. Since robot controller 3 recognizes that enable switch device 100 is in ON state, robot controller 3 transmits a drive permission signal to motor M. As a result, drive control of motor M can be performed, and robot 2 performs a predetermined operation based on a teach content given by teaching pendant 4.

In the mid-operated state, when operation switch 4a is further tightly gripped by the operator, both first switch SW1 and second switch SW2 transition to ON state. As described above, in a case when the operator performs an erroneous operation and thinks that the operator or robot system 1 may fall into a dangerous situation, it is expected that operation switch 4a is gripped tightly. In this case, as illustrated in FIG. 3, the operated state of enable switch device 100 is in position 3. This state is also be referred to as a full-operated state.

When the operated state of enable switch device 100 is in position 3, enable switch device 100 is in OFF state. First state output unit 13 outputs a signal to robot controller 3. Since robot controller 3 recognizes that enable switch device 100 is in OFF state, robot controller 3 transmits a drive stop signal to motor M. As a result, drive control of motor M cannot be performed, and robot 2 does not operate.

When first switch SW1 or second switch SW2 fails, first state determination unit 12 determines that the operated state of enable switch device 100 is neither in positions 1 to 3.

When output signals of first switch SW1 and second switch SW2 are not in the patterns illustrated in FIG. 4, a failure may have occurred in the switches. For example, both terminal a and terminal b of first switch SW1 may be in H potential. In this case, a short fault may have occurred between terminal a and terminal b. In another case, both terminal a and terminal b of second switch SW2 may be in L potential. In this case, a junction in second switch SW2 may have stuck and the junction is not in contact with neither of terminal a nor terminal b, that is, an open fault may have occurred.

First state determination unit 12 determines presence or absence and the type of failure as described above from output signals of first switch SW1 and second switch SW2. An output signal from first state output unit 13 is information on the operated state of enable switch device 100. Failure information on each of first switch SW1 and second switch SW2, that is, information on presence or absence and the type of failure is not directly included in the output signal. However, when no failure has occurred in first switch SW1 or second switch SW2, the operated state of enable switch device 100 does not correspond to any of positions 1 to 3. In such a case, it is determined that enable switch device 100 is in OFF state.

Therefore, on receiving the output signal, robot controller 3 transmits a drive stop signal to motor M. As a result, drive control of motor M cannot be performed, and robot 2 does not operate.

Data transmission from first state output unit 13 to robot controller 3 may be made by wired communication or wireless communication.

The determination result of first state determination unit 12 may be stored in a storage unit (not illustrated). In this case, the storage unit may be external to first signal processor 10. The information stored in the storage unit includes not only the operated state of enable switch device 100 but also failure information on first switch SW1 and second switch SW2.

Effects

As described above, enable switch device 100 according to the present exemplary embodiment transitions to position 1 (first position) which is OFF state when not operated, to position 2 (second position) which is ON state when mid-operated, and to position 3 (third position) which is OFF state when full-operated.

Enable switch device 100 includes at least first switch SW1, second switch SW2, and first signal processor 10. Each of first switch SW1 and second switch SW2 is a two-position switch. First switch SW1 is connected in parallel with second switch SW2.

First signal processor 10 is configured to determine in which one of positions 1 to 3 the operated state of enable switch device 100 is, based on an output signal of each of first switch SW1 and second switch SW2. First signal processor 10 can detect presence or absence of failure in each of first switch SW1 and second switch SW2.

According to the present exemplary embodiment, the operated state of enable switch device 100 can be determined with a simple configuration. This will avoid the operator falling into a dangerous situation by an erroneous operation made by the operator, for example. In addition, an unintentional operation of robot 2 can be prevented, and robot system 1 can be operated safely.

According to the present exemplary embodiment, presence or absence and the type of failure in each of first switch SW1 and second switch SW2 provided in enable switch device 100 can be detected easily. This will prevent robot 2 connected to enable switch device 100 from unintentionally operating, and robot system 1 can be operated safely. In addition, replacement and repair of teaching pendant 4 including enable switch device 100 can be performed easily. This will reduce the downtime and operation cost of robot system 1.

First signal processor 10 includes at least first signal input unit 11, first state determination unit 12, and first state output unit 13.

First signal input unit 11 receives an output signal of each of first switch SW1 and second switch SW2 and inputs the output signal to first state determination unit.

First state determination unit 12 determines in which one among positions 1 to 3 the operated state of enable switch device 100 is, based on the signal input from first signal input unit 11. First state determination unit 12 detects presence or absence of failure in each of first switch SW1 and second switch SW2.

First state output unit 13 outputs the operated state of enable switch device 100 to robot controller 3 based on the determination result of first state determination unit 12. Note that, first state output unit 13 may output failure information on each of first switch SW1 and second switch SW2 to robot controller 3 as necessary.

With such a configuration of first signal processor 10, the operated state of enable switch device 100, presence or absence of failure in each of first switch SW1 and second switch SW2, and the like can be determined easily.

In the present exemplary embodiment, first signal processor 10 executes predetermined software to determine the operated state of enable switch device 100, presence or absence of failure in each of first switch SW1 and second switch SW2, and the like. In this manner, the number of relays used can be reduced as compared with the conventional configuration disclosed in Patent Literature 1. Thus, the replacement cycle of enable switch device 100 and also that of teaching pendant 4 can be lengthened. This will also reduce the downtime and operation cost of robot system 1.

Load drive control apparatus 200 according to the present exemplary embodiment includes at least enable switch device 100 and robot controller (control device) 3. Robot controller 3 is communicatable with enable switch device 100.

When it is determined that enable switch device 100 is in ON state, robot controller 3 transmits a drive permission signal to motor (load) M that is communicatable with robot controller 3.

When it is determined that enable switch device 100 is in OFF state, robot controller 3 transmits a drive stop signal to motor M.

According to the present exemplary embodiment, robot controller 3 permits or regulates driving of motor M, corresponding to the state of enable switch device 100. This will prevent happening of an accident caused by an operation error made by the operator, for example, and safety of the operator is secured. In addition, an unintentional operation of robot 2 can be prevented, and robot system 1 can be operated safely.

When it is detected that either first switch SW1 or second switch SW2 has failed, robot controller 3 transmits a drive stop signal to motor M.

This configuration will prevent robot 2 connected to enable switch device 100 from unintentionally operating, and robot system 1 can be operated safely. In addition, presence or absence and the type of failure in each of first switch SW1 and second switch SW2 can be detected easily. As a result, replacement and repair of teaching pendant 4 including enable switch device 100 can be performed easily, and the down time and operation cost of robot system 1 can be reduced.

Second Exemplary Embodiment

Figure 5:
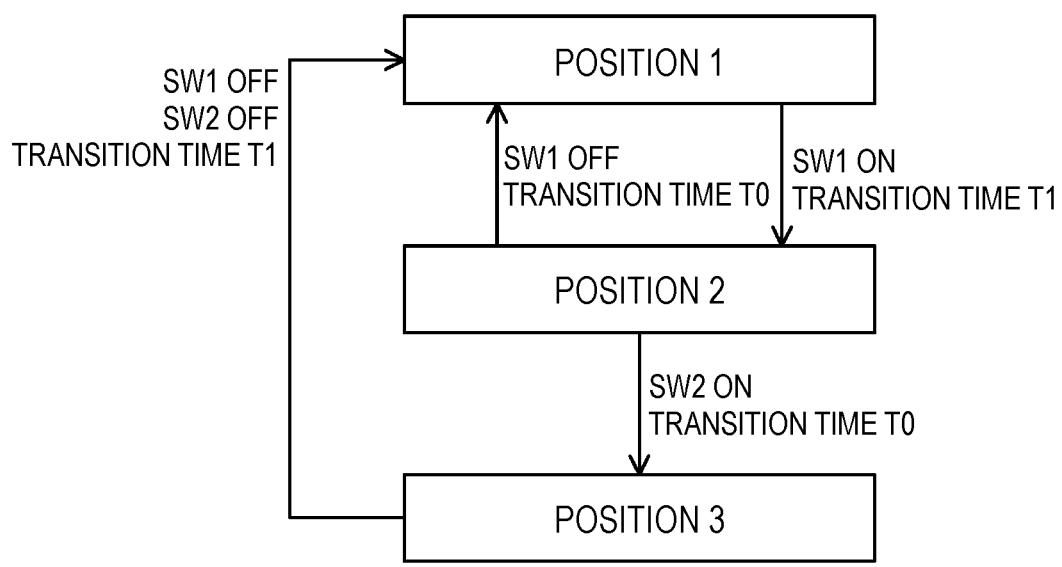
FIG. 5 is a schematic diagram illustrating transition of an operated state of an enable switch device according to a second exemplary embodiment.

FIG. 5 schematically illustrates transition of the operated state of an enable switch device according to the present exemplary embodiment. For convenience of description, in FIG. 5 and in subsequent drawings, the same part as that of the first exemplary embodiment is denoted with the same reference mark, and detailed description thereof will be omitted.

Enable switch device 100 of the present exemplary embodiment is different from enable switch device 100 of the first exemplary embodiment in the following points.

As illustrated in FIG. 5, when the operated state of enable switch device 100 has transitioned from position 1 (first position) to position 2 (second position), first state determination unit 12 determines, when transition time T1 has elapsed after detection of transition of the state, that the operated state of enable switch device 100 has transitioned.

When the operated state of enable switch device 100 has transitioned from position 3 (third position) to position 1, first state determination unit 12 determines, when transition time T1 has elapsed after detection of transition of the state, that the operated state of enable switch device 100 has transitioned. In the present exemplary embodiment, transition time T1 is set to 24 msec, but the present invention is not particularly limited to this.

When the operated state of enable switch device 100 has transitioned from position 2 to position 1 or position 3, first state determination unit 12 determines, when transition time T0 (<T1) has elapsed after detection of transition of the state, that the operated state of enable switch device 100 has transitioned.

According to the present exemplary embodiment, the start timing of driving motor M can be delayed by transition time T1 from the timing when enable switch device 100 enters into the mid-operated state. This will prevent robot 2 from starting an operation without being noticed by the operator, and safety of the operator can be secured. There is a case that enable switch device 100 that has transitioned from the mid-operated state to the full-operated state then transitions to the non-operated state. In such a case, determination that enable switch device 100 has transitioned from the full-operated state to the non-operated state is made after a delay of transition time T1. Thus, the timing of starting an operation of robot 2 by a subsequent mid-operation can be delayed, and safety of the operator can be enhanced.

Meanwhile, when enable switch device 100 transitions from the mid-operated state to the full-operated state or the non-operated state, the operation of robot 2 needs to be stopped immediately to secure safety of the operator.

In such a case, determination that the operated state of enable switch device 100 has transitioned is made immediately after detecting transition of the state, and thus robot controller 3 can immediately transmit a drive stop signal to robot 2 to stop the operation of robot 2. This will enhance safety of the operator.

Third Exemplary Embodiment

Figure 6:
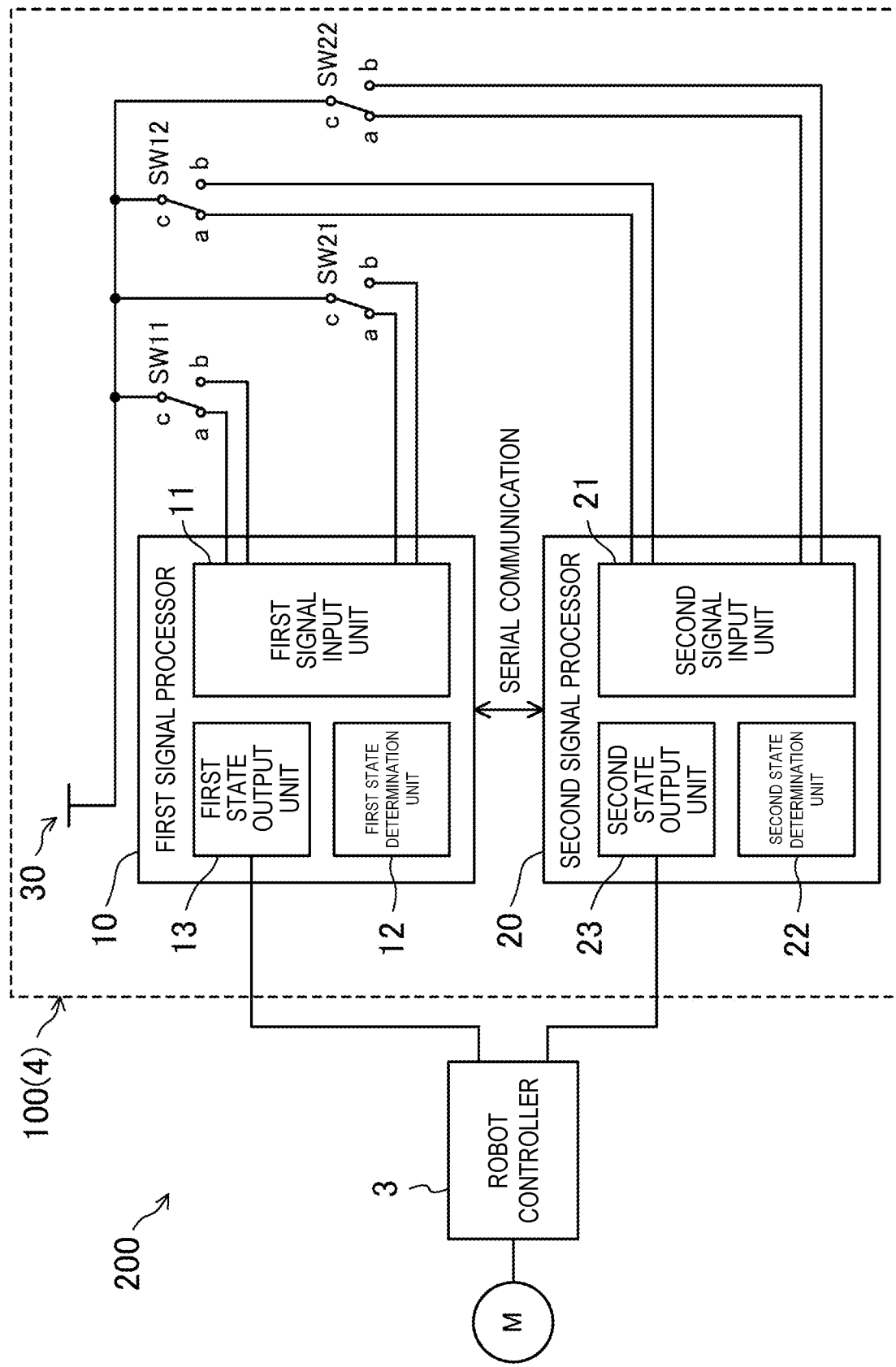
FIG. 6 is a schematic configuration diagram of a load drive control apparatus according to a third exemplary embodiment.
Figure 7:
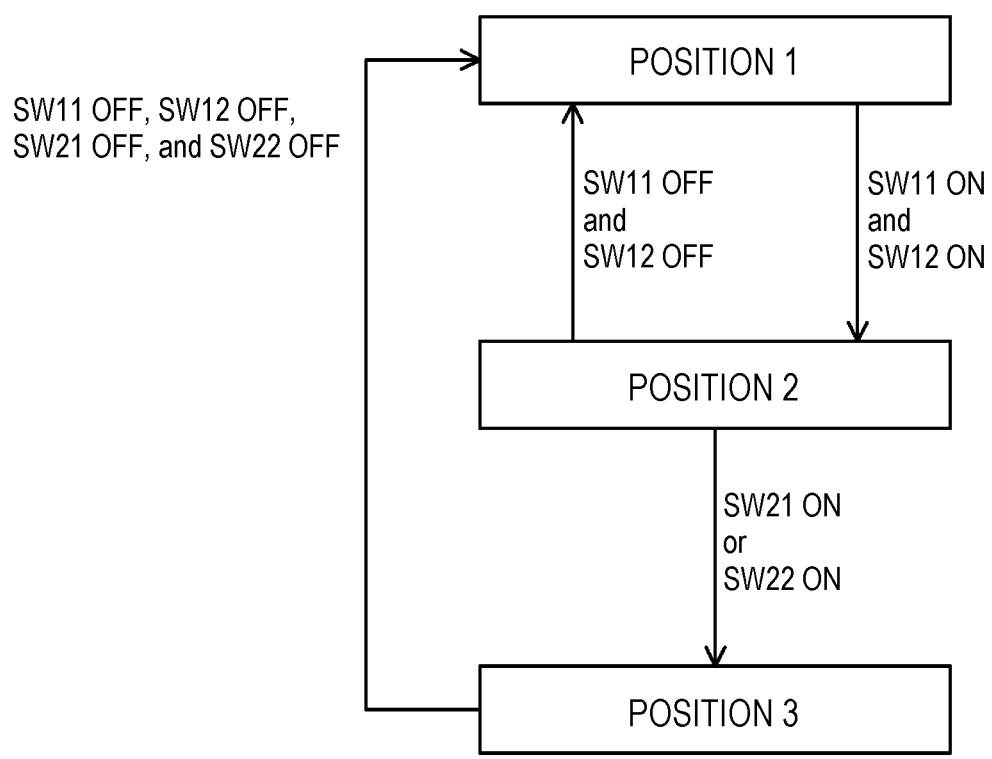
FIG. 7 is a schematic diagram illustrating transition of an operated state of an enable switch device.

FIG. 6 illustrates a schematic configuration diagram of a load drive control apparatus according to the present exemplary embodiment, and FIG. 7 schematically illustrates transition of the operated state of an enable switch device. FIG. 8 illustrates determination results of a first state determination unit and a second state determination unit. In FIG. 6, only enable switch device 100, of teaching pendant 4, is illustrated in a form of a circuit diagram as in the first exemplary embodiment. Similarly, in FIG. 6, only motor M connected to one joint shaft 2b is illustrated.

Enable switch device 100 of the present exemplary embodiment is different from enable switch device 100 of the first exemplary embodiment in the following points.

As illustrated in FIG. 6, enable switch device 100 includes at least first to fourth switches SW11 to SW22, first signal processor 10, and second signal processor 20.

Each of first to fourth switches SW11 to SW22 is a two-position switch. Terminals c are common terminals of first to fourth switches SW11 to SW22, and are each connected to power source 30. That is, first to fourth switches SW11 to SW22 are connected in parallel among each other. Operations of first to fourth switches SW11 to SW22 are similar to the operations of first switch SW1 and second switch SW2 described in the first exemplary embodiment.

First signal processor 10 is configured to determine the state of each of first switch SW11 and second switch SW21. That is, the states of first switch SW11 and second switch SW21, whether ON state or OFF state, are determined. First signal processor 10 detects presence or absence of failure in each of first switch SW 11 and second switch SW 21.

In more detail, similar to the first exemplary embodiment, first signal processor 10 includes at least first signal input unit 11, first state determination unit 12, and first state output unit 13. Since the function of first signal input unit 11 is similar to that described in the first exemplary embodiment, description thereof will be omitted.

First state determination unit 12 determines the state of each of first switch SW11 and second switch SW21 based on a signal input from first signal input unit 11. That is, the states of first switch SW11 and second switch SW21, whether ON state or OFF state, are determined. First state determination unit 12 detects presence or absence of failure in each of first switch SW11 and second switch SW21 based on the signal input from first signal input unit 11. Presence or absence and the type of failure in each of first switch SW11 and second switch SW21 are detected by a method similar to that described in the first exemplary embodiment. For example, when both terminal a and terminal b of first switch SW11 are in H potential, it is determined that a short fault has occurred in first switch SW11. When both terminal a and terminal b of second switch SW21 are in L potential, it is determined that an open fault has occurred in second switch SW21.

First state output unit 13 outputs, to robot controller 3, information on the state of each of first switch SW11 and second switch SW21, that is, information on the states of first switch SW11 and second switch SW21, whether ON state or OFF state, based on the determination result of first state determination unit 12. Note that, first state output unit 13 may output failure information on each of first switch SW11 and second switch SW21 to robot controller 3.

The function and configuration of second signal processor 20 are similar to the function and configuration of first signal processor 10. Second signal processor 20 handles input signals of third switch SW12 and fourth switch SW22.

Second signal processor 20 is configured to determine the state of each of third switch SW12 and fourth switch SW22. That is, the states of third switch SW12 and fourth switch SW22, whether ON state or OFF state, are determined. Second signal processor 20 detects presence or absence of failure in each of third switch SW12 and fourth switch SW22.

In more detail, second signal processor 20 includes at least second signal input unit 21, second state determination unit 22, and second state output unit 23.

Second signal input unit 21 receives an output signal of each of third switch SW12 and fourth switch SW22 and inputs the output signal to second state determination unit 22.

Second state determination unit 22 determines the state of each of third switch SW12 and fourth switch SW22 based on the signal input from second signal input unit 21. That is, the states of third switch SW12 and fourth switch SW22, whether ON state or OFF state, are determined. Second state determination unit 22 detects presence or absence of failure in each of third switch SW12 and fourth switch SW22 based on the signal input from second signal input unit 21.

Second state output unit 23 outputs, to robot controller 3, information on the state of each of third switch SW12 and fourth switch SW22, that is, information on the states of third switch SW12 and fourth switch SW22, whether ON state or OFF state, based on the determination result of second state determination unit 22. Note that, second state output unit 23 may output failure information on each of third switch SW12 and fourth switch SW22 to robot controller 3.

Enable switch device 100 determines the operated state of enable switch device 100 based on the determination result of first signal processor 10 and the determination result of second signal processor 20.

As described above, first signal processor 10 determines only the state of each of first switch SW11 and second switch SW21. Second signal processor 20 determines only the state of each of third switch SW12 and fourth switch SW22. The operated state of enable switch device 100 is finally determined based on the determination result of first signal processor 10 and the determination result of second signal processor 20.

As illustrated in FIGS. 7 and 8, when all first to fourth switches SW11 to SW22 are in OFF state, it is determined that the operated state of enable switch device 100 is in position 1 (first position). That is, enable switch device 100 is determined to be in OFF state (non-operated state).

When first switch SW11 and third switch SW12 are in ON state and second switch SW21 and fourth switch SW22 are in OFF state, it is determined that the operated state of enable switch device 100 is in position 2 (second position). That is, enable switch device 100 is determined to be in ON state (mid-operated state).

When all first to fourth switches SW11 to SW22 are in ON state, it is determined that the operated state of enable switch device 100 is in position 3 (third position). That is, enable switch device 100 is determined to be in ON state (full-operated state). Note that, the timing at which either second switch SW21 or fourth switch SW22 enters into ON state is the timing at which the operated state of enable switch device 100 is determined to be in position 3.

It goes without saying that when a failure has occurred in any of first to fourth switches SW11 to SW22, enable switch device 100 is determined to be in OFF state.

To obtain a final determination result, first signal processor 10 and second signal processor 20 are configured to be communicatable with each other. In the example illustrated in FIG. 6, serial communication is performed between first signal processor 10 and second signal processor 20.

When the determination result of first signal processor 10 and the determination result of second signal processor 20 match, it is determined that the determination result is the operated state of enable switch device 100.

Meanwhile, when the determination result of first signal processor 10 and the determination result of second signal processor 20 do not match, it is determined that enable switch device 100 is in OFF state.

Note that these determinations may be executed by first signal processor 10 that has received the determination result of second state determination unit 22, for example, by first state determination unit 12. Alternatively, these determinations may be executed by second signal processor 20 that has received the determination result of first state determination unit 12, for example, by second state determination unit 22.

Another determination unit (not illustrated) may be provided in one of first signal processor 10 and second signal processor 20 or in enable switch device 100. In this case, this determination unit receives the determination result of first signal processor 10 and the determination result of second signal processor 20, and determines the state of enable switch device 100.

Alternatively, it may be configured that robot controller 3 that has received an output signal of first state output unit 13 and an output signal of second state output unit 23 determines the state of enable switch device 100.

According to the present exemplary embodiment, an effect similar to that obtained by the configuration illustrated in the first exemplary embodiment can be obtained. That is, the operated state of enable switch device 100 can be determined with a simple configuration. This will avoid the operator falling into a dangerous situation by an erroneous operation made by the operator, for example. In addition, an unintentional operation of robot 2 can be prevented, and robot system 1 can be operated safely.

According to the present exemplary embodiment, presence or absence and the type of failure in each of first to fourth switches SW1 to SW22 provided in enable switch device 100 can be detected easily. This will prevent robot 2 connected to enable switch device 100 from unintentionally operating, and robot system 1 can be operated safely. In addition, replacement and repair of teaching pendant 4 including enable switch device 100 can be performed easily. This will reduce the downtime and operation cost of robot system 1.

Enable switch device 100 illustrated in the present exemplary embodiment is a so-called duplex circuit including two sets of combination circuits each including two switches and a signal processor illustrated in the first exemplary embodiment. Enable switch device 100 illustrated in the present exemplary embodiment is configured to correctly determine the operated state of enable switch device 100 only when both the two combination circuits are functioning normally.

For this reason, first signal processor 10 and second signal processor 20 are communicatable with each other. When the determination result of first signal processor 10 and the determination result of second signal processor 20 do not match, it is determined that enable switch device 100 is in OFF state.

With this configuration, safety of the operator can be enhanced. In addition, an unintentional operation of robot 2 can be prevented, and robot system 1 can be operated safely.

In load drive control apparatus 200 according to the present exemplary embodiment, when it is detected that there is a failure in any one of first to fourth switches SW11 to SW22, robot controller 3 transmits a drive stop signal to motor M.

This configuration will prevent robot 2 connected to enable switch device 100 from unintentionally operating, and robot system 1 can be operated safely. Presence or absence and the type of failure in each of first to fourth switches SW11 to SW22 can be detected easily. As a result, replacement and repair of teaching pendant 4 including enable switch device 100 can be performed easily, and the down time and operation cost of robot system 1 can be reduced.

Fourth Exemplary Embodiment

FIG. 9 schematically illustrates transition of the operated state of an enable switch device according to the present exemplary embodiment.

The configuration of enable switch device 100 of the present exemplary embodiment is similar to that described in the third exemplary embodiment. That is, enable switch device 100 and a duplex circuit are included.

Similarly to the second exemplary embodiment, in determining the operated state of enable switch device 100 according to the present exemplary embodiment, enable switch device 100 determines, when a predetermined transition time has elapsed after detection of transition of the state, that the operated state of enable switch device 100 has transitioned.

Specifically, when the operated state of enable switch device 100 has transitioned from position 1 to position 2, first state determination unit 12 and second state determination unit 22 determine, when transition time T2 has elapsed after detection of transition of the state, that the operated state of enable switch device 100 has transitioned.

When the operated state of enable switch device 100 has transitioned from position 3 to position 1, first state determination unit 12 and second state determination unit 22 determine, when transition time T2 has elapsed after detection of transition of the state, that the operated state of enable switch device 100 has transitioned.

Note that, transition time T2 may be the same as or different from transition time T1 described in the second exemplary embodiment. Enable switch device 100 of the present exemplary embodiment includes first to fourth switches SW11 to SW22. Considering reaction times of first to fourth switches SW11 to SW22, transition time T2 is preferably longer than transition time T1.

When the operated state of enable switch device 100 has transitioned from position 2 to position 1 or position 3, first state determination unit 12 and second state determination unit 22 determine, immediately after detection of transition of the state, in this case, when transition time T0 (<T1, T2) has elapsed, that the operated state of enable switch device 100 has transitioned.

According to the present exemplary embodiment, an effect similar to that obtained by the configuration illustrated in the second exemplary embodiment can be obtained. That is, the start timing of driving motor M can be delayed by transition time T2 from the timing that is immediately after enable switch device 100 has entered into the mid-operated state. This will prevent robot 2 from starting an operation without being noticed by the operator, and safety of the operator can be secured. There is a case that enable switch device 100 that has transitioned from the mid-operated state to the full-operated state then transitions to the non-operated state. In such a case, determination that enable switch device 100 has changed from the full-operated state to the non-operated state is made after a delayed of transition time T2. Thus, the timing of starting an operation of robot 2 by a subsequent mid-operation can be delayed, and safety of the operator can be enhanced.

Meanwhile, when enable switch device 100 transitions from the mid-operated state to the full-operated state or the non-operated state, the operation of robot 2 needs to be stopped immediately to secure safety of the operator.

In such a case, determination that the operated state of enable switch device 100 has transitioned is made immediately after detecting transition of the state, and thus robot controller 3 can immediately transmit a drive stop signal to robot 2 to stop the operation of robot 2. This will enhance safety of the operator.

As described in the third exemplary embodiment, either first state determination unit 12 or second state determination unit 22 may finally determine the state of enable switch device 100. Alternatively, the state of enable switch device 100 may be finally determined by another determination unit (not illustrated) provided in enable switch device 100.

When robot 2 unintentionally operates or stops in an industrial machine used for welding work or processing work, there is a high risk of an operator being exposed to danger.

Thus, enable switch device 100 and load drive control apparatus 200 of the present specification are preferably connected to robot 2 provided in the industrial machine to be used.

INDUSTRIAL APPLICABILITY

The enable switch device of the present disclosure can determine an operated state with a simple configuration and can detect failure in an internal two-position switch, and thus is useful to be used for industrial machines including a robot.

REFERENCE MARKS IN THE DRAWINGS

1: robot system
2: robot
2a: robot arm
2b: joint shaft
3: robot controller (control device)
4: teaching pendant
4a: operation switch
5: communication cable
10: first signal processor
11: first signal input unit
12: first state determination unit 13: first state output unit
20: second signal processor
21: second signal input unit
22: second state determination unit
23: second state output unit
30: power source
100: enable switch device
200: load drive control apparatus
M: motor (load)
SW1: first switch
SW2: second switch
SW11: first switch
SW21: second switch
SW12: third switch
SW22: fourth switch

The invention claimed is:

1. An enable switch device that transitions to a first position that is OFF state when not operated, to a second position that is ON state when mid-operated, and to a third position that is OFF state when full-operated, the enable switch device comprising:
   a first switch;
   a second switch; and
   a first signal processor, wherein
   each of the first switch and the second switch is a two-position switch, and
   the first signal processor is configured to determine in which one of the first position, the second position, and the third position an operated state of the enable switch device is, based on an output signal of the first switch and an output signal of the second switch, and detect presence or absence of failure in each of the first switch and the second switch.

2. The enable switch device according to claim 1, wherein
   the first signal processor includes at least a first signal input unit, a first state determination unit, and a first state output unit,
   the first signal input unit receives the output signal of the first switch and the output signal of the second switch and input a signal to the first state determination unit,
   the first state determination unit determines in which one of the first position, the second position, and the third position the operated state of the enable switch device is, based on the signal input from the first signal input unit, and detects presence or absence of failure in each of the first switch and the second switch, and
   the first state output unit outputs the operated state of the enable switch device based on a determination result of the first state determination unit.

3. The enable switch device according to claim 2, wherein when the operated state of the enable switch device has transitioned from the first position to the second position and when the operated state of the enable switch device has transitioned from the third position to the first position, the first state determination unit determines, when a predetermined time has elapsed after detection of transition of state, that the operated state of the enable switch device has transitioned.

4. The enable switch device according to claim 3, wherein when the operated state of the enable switch device has transitioned from the second position to the first position or the third position, the first state determination unit determines, immediately after detection of transition of state, that the operated state of the enable switch device has transitioned.

5. A load drive control apparatus comprising at least:
   the enable switch device according to claim 1; and
   a control device configured to communicate with the enable switch device, wherein
   when determination is made that the enable switch device is in ON state, the control device transmits a drive permission signal to a load configured to communicate with the control device, and
   when determination is made that the enable switch device is in OFF state, the control device transmits a drive stop signal to the load.

6. The load drive control apparatus according to claim 5, wherein when a failure in either the first switch or the second switch is detected, the control device transmits a drive stop signal to the load.

7. An enable switch device that transitions to a first position that is OFF state when not operated, to a second position that is ON state when mid-operated, and to a third position that is OFF state when full-operated, the enable switch device comprising at least:
   a first switch;
   a second switch;
   a third switch;
   a fourth switch;
   a first signal processor; and
   a second signal processor, wherein
   each of the first switch, the second switch, the third switch, and the fourth switch is a two-position switch,
   the first signal processor is configured to determine a state of the first switch and a state of the second switch and detect presence or absence of failure in each of the first switch and the second switch,
   the second signal processor is configured to determine a state of the third switch and a state of the fourth switch and detect presence or absence of failure in each of the third switch and the fourth switch, and
   an operated state of the enable switch device is determined based on a determination result of the first signal processor and a determination result of the second signal processor.

8. The enable switch device according to claim 7, wherein
   the first signal processor includes at least a first signal input unit, a first state determination unit, and a first state output unit,
   the first signal input unit receives an output signal of the first switch and an output signal of the second switch, and inputs the signal to the first state determination unit,
   the first state determination unit determines a state of the first switch and a state of the second switch based on the signal input from the first signal input unit, and detects presence or absence of failure in each of the first switch and the second switch,
   the first state output unit outputs information on the state of the first switch and the state of the second switch based on a determination result of the first state determination unit,
   the second signal processor includes at least a second signal input unit, a second state determination unit, and a second state output unit,
   the second signal input unit receives an output signal of the third switch and an output signal of the fourth switch and inputs the signal to the second state determination unit,
   the second state determination unit determines a state of the third switch and a state of the fourth switch based on the signal input from the second signal input unit, and detects presence or absence of failure in each of the third switch and the fourth switch, the second state output unit outputs information on the state of the third switch and the state of the fourth switch based on a determination result of the second state determination unit, the first signal processor and the second signal processor are configured to communicate with each other, when the determination result of the first signal processor and the determination result of the second signal processor match, determination is made that the determination result is the operated state of the enable switch device, and when the determination result of the first signal processing unit and the determination result of the second signal processing unit do not match, determination is made that the enable switch device is in OFF state.

9. The enable switch device according to claim 8, wherein when the operated state of the enable switch device has transitioned from the first position to the second position and when the operated state of the enable switch device has transitioned from the third position to the first position, the first state determination unit and the second state determination unit determine, when a predetermined time has elapsed after detection of transition of state, that the operated state of the enable switch device has transitioned.

10. The enable switch device according to claim 9, wherein when the operated state of the enable switch device has transitioned from the second position to the first position or the third position, the first state determination unit and the second state determination unit determine, immediately after detection of transition of state, that the operated state of the enable switch device has transitioned.

11. A load drive control apparatus comprising at least:
   the enable switch device according to claim 7; and
   a control device configured to communicate with the enable switch device, wherein
   when determination is made that the enable switch device is in ON state, the control device transmits a drive permission signal to a load configured to communicate with the control device, and
   when determination is made that the enable switch device is in OFF state, the control device transmits a drive stop signal to the load.

12. The load drive control apparatus according to claim 11, wherein when a failure in any of the first switch, the second switch, the third switch, and the fourth switch is detected, the control device transmits a drive stop signal to the load.

* * * * *